Oct. 25, 1949.  W. H. WATKINS  2,485,795
TRANSPOSING KEYBOARD
Filed Feb. 1, 1946  2 Sheets-Sheet 1
Fig-1-
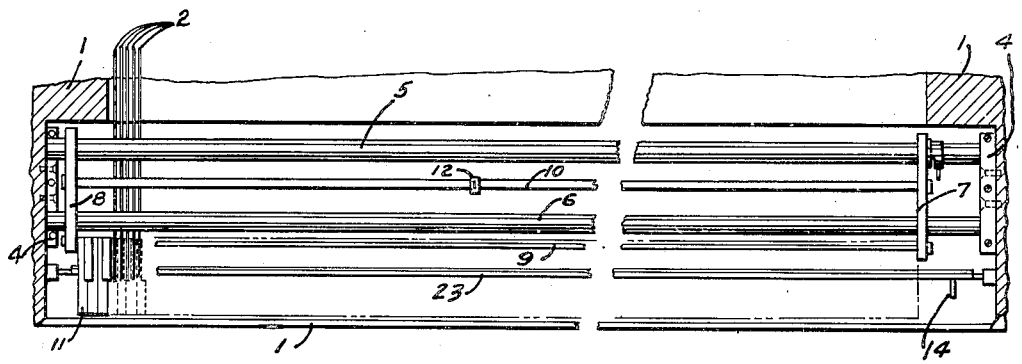
Fig-2-
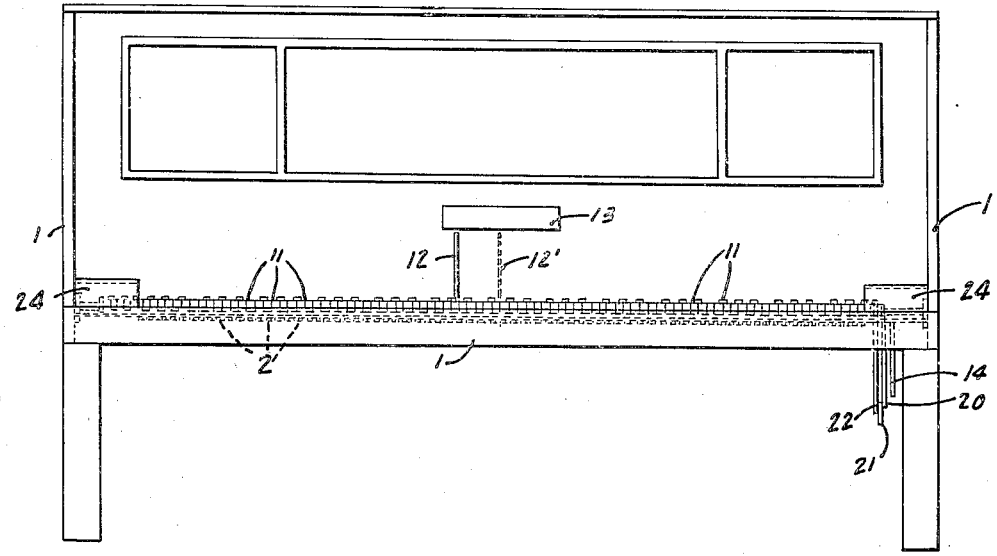
INVENTOR.
WILLIAM HOWARD WATKINS
BY

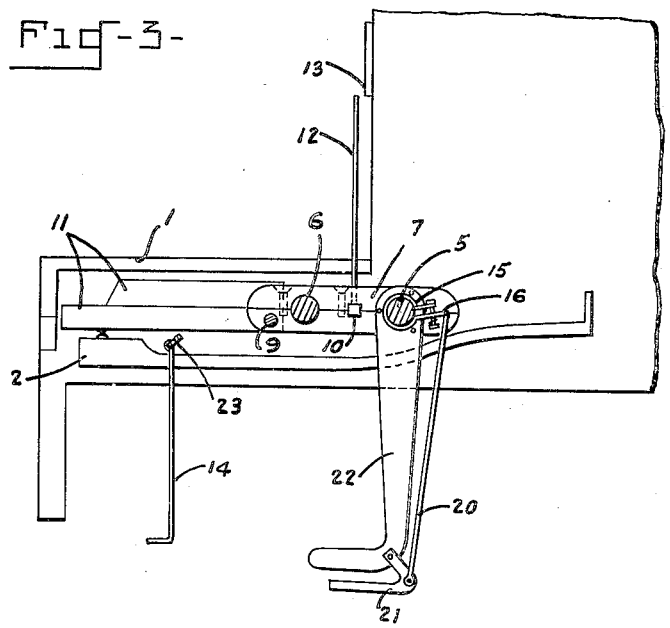
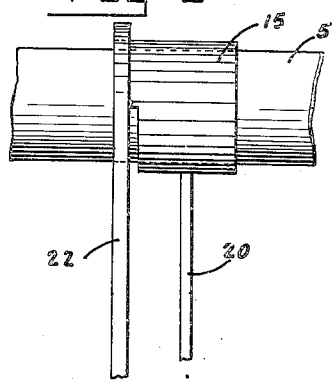
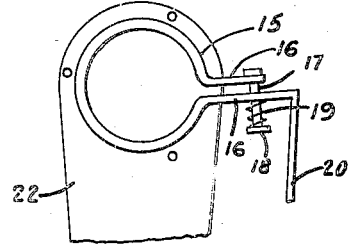

Patented Oct. 25, 1949

2,485,795

UNITED STATES PATENT OFFICE 2,485,795

TRANSPOSING KEYBOARD

William H. Watkins, Axton, Va.

Application February 1, 1946, Serial No. 644,884

1 Claim. (Cl. 84—447)

This invention relates to new and useful improvements in a transposition keyboard for pianos.

The invention has for an object the provision of an adjunct to a piano keyboard whereby auxiliary keys may be shifted into various lateral positions and held in these positions to transpose the keyboard.

A further object of the invention is to provide a novel arrangement of parts for supporting the keys and the hammers, and for translating these parts as desired.

It is still further object of the invention to provide an attachment for pianos which shall be economical to construct, easy to install and simple to operate, for the purpose of transposing keyboards.

A still further object of the invention resides in the provision of a transposing mechanism of the character above set forth, in which tilting and shifting of the keyboard will be prevented by providing proper guiding means therefor without interfering with easy adjustment of the keyboard to its various positions by the provision of adjusting, maintaining and releasing members projecting through the piano casing at points convenient to the performer, provision being made without material alteration of the piano structure or the piano casing structure for insertion or removal of the adjustable keyboard as well as movement of the latter to its various positions.

It is a still further object of the invention to provide an indicating member to ride over an indicating scale and thereby indicate the key for which the keyboard is set.

With the foregoing and other objects in view, as will appear as the description proceeds, the invention consists in the novel construction, combination and arrangement of cooperating elements as hereinafter more specifically set forth, pointed out in the claim and shown in the accompanying drawings forming a part of the present application, and in which:

Figure 1 is a plan view, partly in section, of various parts associated with my novel transposing keyboard;

Figure 2 is an elevational view of a piano with my novel transposing keyboard installed;

Figure 3 is a side elevational view of certain mechanism for adjusting and locking the above-mentioned keyboard;

Figure 4 is a front view of a control rod;

Figure 5 is a front view of a portion of a brake-mechanism; and

Figure 6 is an end view of Figure 5.

Referring more in detail to the drawings, in which similar reference characters designate corresponding parts throughout the several views, 1 represents the frame of a piano, having the usual action diagrammatically illustrated in part by key levers 2.

A pair of brackets 4 are suitably secured to the side walls of the piano, as by screws, and mount therebetween a plurality of longitudinally extending fixed rods 5 and 6 which extend transversely of the piano parallel to and vertically spaced from the key levers 2.

A pair of brackets 7 and 8 are slidable on the rods 5 and 6 and are connected together by a pair of rods 9 and 10. Such brackets and rods 9 and 10 comprise a carriage which is laterally slidable on rods 5 and 6 in spaced relation to the piano action. A keyboard comprising a plurality of keys 11 is secured on the carriage between the brackets 7 and 8. Such keys 11 are pivoted on the rod 9 of the carriage and, by virtue of their confinement between the brackets 7 and 8, are shiftable with the carriage. A pointer 12 is secured to the rod 10 in any suitable manner and travels with the carriage relative to a fixed scale 13 on the piano.

It must be recalled that in the presently utilized musical scale an octave consists of a total of eight diatonic tones and five chromatic tones, or thirteen tones altogether. Since the last tone of one octave corresponds to the first tone of a succeeding octave, there may be considered to be twelve different tones within the confines of each octave, or a total of eleven intervals between tones. Accordingly, for the purposes of the present invention the transposing keyboard is arranged to be moved a maximum of five notes or intervals down the scale or six notes or intervals up the scale from the central or key of C position.

Movement of the transpose keyboard is, of course, indicated by the movement of the pointer 12 with respect to the scale 13, the scale 13 being appropriately marked to indicate the various keys in which the music may be played, such as key of G, F, etc.

In order to move the transposing keyboard, the lever 14 is pushed towards the rear of the piano, thereby lifting the transpose keyboard, by causing pivoting of the cam rod 23.

The rod 9 and the brackets 7, 8 which carry the rod 9, are normally locked in any one of the positions which may be taken by the keyboard 11, by means of a brake consisting of a shoe 15 surrounding the rod 5 and provided with two parallel extensions 16. Coaxial holes are provided in the said parallel extensions 16 through which extend a pin 17 secured at one end to one extension 16 and provided at its other end with a shoulder 18 and a spring 19 resting thereagainst, and which provide locking pressure for the brake shoe 15.

A rod 20 extends from the extensions 16 and is actuable by means of a bell-crank lever 21 to release the brake shoe 15, and thereby to permit translatory motion of the keyboard 11. The bell crank lever 21 is pivoted at one end to the L-shaped rod 22, which may be utilized for laterally adjusting the keyboard 11, and which is secured by means of suitable bolts or rivets, at its other end, to the bracket 7.

In order to move the transposing keyboard, then, it is necessary merely to actuate the lever 14 to lift the transpose keys, apply pressure to the bell crank lever 21 to release brake 15 and thereafter to move the rod or carriage lever 22 until the pointer 12 is aligned with the desired insignia on the scale 13.

Arranged at each extremity of the piano keyboard are the keyboard covers 24, which are required by reason of the fact that the transpose keyboard is longer than the normal keyboard, and is transposable. The distance between the covers 24 is that equal to the normal piano keyboard, and when the transpose keyboard is shifted the extra keys thereon are covered by the keyboard covers 24.

It is deemed that the construction and operation of the embodiment of the invention herein described is readily understandable from the foregoing description, and that it will be evident that upon adjustment of the transpose keyboard in any of its various positions, the keys 11 will strike the keys 2, and that any piece of music may be played in the key in which it is written and automatically transposed to the key desired, owing to the position of the keyboard.

While the preferred embodiment of the invention has been shown and described, it is to be understood that minor changes in the details of construction and arrangement of parts may be resorted to within the scope of what is claimed without departing from the spirit of the invention.

What I claim is:

In a transposing keyboard for pianos and the like, including a fixed action, a fixed guide rod extending across said action, and a carriage slidable on said rod, a keyboard operatively disposed on said carriage relative to said action and shiftable with said carriage; an actuating handle for said carriage, a spring loaded brake carried by said carriage and normally engaging said rod to lock said carriage against movement, and a brake lever juxtaposed to said handle to permit simultaneous release of said brake shifting of said carriage.

WILLIAM H. WATKINS.

REFERENCES CITED

The following references are of record in the file of this patent:

UNITED STATES PATENTS

| Number | Name | Date |
|---|---|---|
| 758,760 | Kohlmoos | May 3, 1904 |
| 1,004,350 | Bialik | Sept. 26, 1911 |
| 1,107,783 | Goss | Aug. 18, 1914 |
| 1,216,424 | Edwards | Feb. 20, 1917 |
| 1,532,793 | Zepeda | Apr. 7, 1925 |
| 2,192,077 | Hansen | Feb. 27, 1940 |